(12) United States Patent
Peddada et al.

(10) Patent No.: US 11,265,156 B2
(45) Date of Patent: Mar. 1, 2022

(54) SECRETS MANAGEMENT USING KEY AGREEMENT

(71) Applicant: salesforce.com, inc., San Francisco, CA (US)

(72) Inventors: Prasad Peddada, Alameda, CA (US); Taher Elgamal, San Francisco, CA (US); Aaron Marcus Johnson, Bentonville, AR (US)

(73) Assignee: salesforce.com, inc., San Francisco, CA (US)

( * ) Notice: Subject to any disclaimer, the term of this patent is extended or adjusted under 35 U.S.C. 154(b) by 59 days.

(21) Appl. No.: 16/938,715

(22) Filed: Jul. 24, 2020

(65) Prior Publication Data
US 2022/0029790 A1     Jan. 27, 2022

(51) Int. Cl.
| | | |
|---|---|---|
| *H04L 29/06* | (2006.01) | |
| *H04L 9/08* | (2006.01) | |
| *H04L 9/06* | (2006.01) | |
| *H04L 9/30* | (2006.01) | |

(52) U.S. Cl.
CPC ............ *H04L 9/085* (2013.01); *H04L 9/0637* (2013.01); *H04L 9/0825* (2013.01); *H04L 9/0841* (2013.01); *H04L 9/0891* (2013.01); *H04L 9/3066* (2013.01)

(58) Field of Classification Search
None
See application file for complete search history.

(56) References Cited

U.S. PATENT DOCUMENTS

| | | | |
|---|---|---|---|
| 2016/0302061 A1* | 10/2016 | Park ...................... | H04W 12/04 |
| 2020/0320219 A1* | 10/2020 | Barouch ............... | H04L 9/3239 |
| 2021/0194686 A1* | 6/2021 | Grass ..................... | G16B 20/00 |
| 2021/0297252 A1* | 9/2021 | Licciardello .......... | H04L 9/0656 |

* cited by examiner

*Primary Examiner* — Andrew J Steinle
(74) *Attorney, Agent, or Firm* — Holland & Hart LLP

(57) ABSTRACT

A client system may generate a new key pair for a secrets management process. The client may generate a shared secret using the private key of the new key pair and a public key of a secrets management server. Using the shared secret, the client may derive an encryption key and encrypt a data payload for subsequent decryption by the secrets management server. Upon encryption of the data payload, the client may erase the private key. Subsequently, the client or an associated client may call the secrets management server for decryption of the data payload. The secrets management server may derive the encryption key using the public key associated with the encrypted payload and the private key of the secrets management server and use the encryption key to decrypt the data payload for use by the client or an associated client.

20 Claims, 9 Drawing Sheets

SECRETS MANAGEMENT USING KEY AGREEMENT

FIELD OF TECHNOLOGY

The present disclosure relates generally to database systems and data processing, and more specifically to secrets management using key agreement.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Cryptographic keys are used in a variety of applications, including security of data on a server or data store. In some examples, a key may be used to encrypt contents of an entire data store or large portions of a data store. If that key is compromised, then all of the data of the data store may be compromised. Unauthorized disclosure of data may result in harm to a user, an organization, or both.

DETAILED DESCRIPTION

Figure 1:
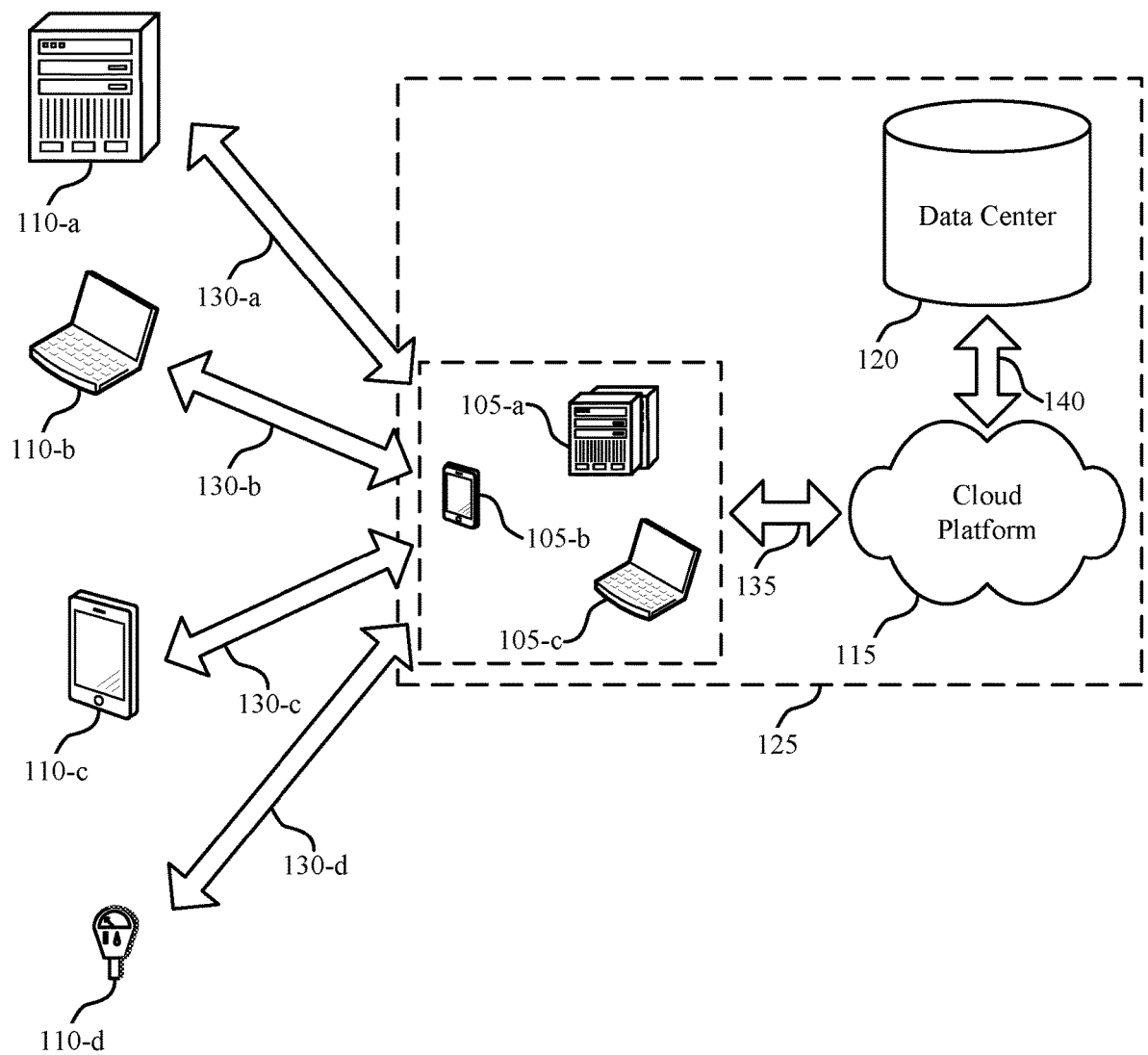
FIG. 1 illustrates an example of a system for securing data that supports secrets management using key agreement in accordance with aspects of the present disclosure.

Cryptographic keys are used in a variety of applications, including security of data on a server or data store. In some examples, a key may be used to encrypt contents of an entire data store or large portions of a data store. If that key is compromised, then all of the data of the data store may be compromised. Unauthorized disclosure of data may result in harm to a user, an organization, or both.

Key agreement protocols may support generation of shared secrets between two parties without interference from a third party. In some cases, each party may generate the shared secret using respective private keys and the public key of the other party. For example, Elliptic Curve Diffie-Hellman (ECDH) protocol is a key agreement protocol that allows two parties to establish a shared secret, and thus derive a symmetric key, over an insecure channel using elliptic curve public/private key pairs.

Implementations described herein leverage key agreement to support secure secret management. A secrets management server, which may include or support a hardware security module (e.g., a secure chip or chipset), may be associated with a key pair including a server public key and a server private key. A client may support generation of key pairs, such as elliptic curve key pairs. The client may leverage the implementations described herein for secure secrets management. For example, the client may generate a new key pair for a secret management process. The client may generate a shared secret using the private key of the new key pair and a public key of the secrets management server. Using the shared secret, the client may derive an encryption key and encrypt a data payload for secret management. Upon generation of the encryption key and encryption data payload, the client may erase the private key. Thus, for each secret, a new key pair is generated and the private key is erased.

The server may decrypt the encrypted data payload when ready for use (e.g., upon a request by the client or an associated client). When the data payload is ready for use, the secret management server may generate the shared secret using the public associated with the secret (which was generated for the secret management) and the private key of the server (e.g., the private key that is associated with the secrets management server public key as a key pair). The shared secret may be used to derive the encryption key and decrypt the data payload for use by the client. Thus, using this process, the server may support decryption of various encrypted data payloads, where each data payload is encrypted using an encryption key derived using a different client key pair. Because each data payload is separately encrypted, data security is increased and the potential for improper data disclosure is limited or avoided.

Aspects of the disclosure are initially described in the context of an environment supporting an on-demand database service. Aspects of the disclosure are further described with respect to a general system diagram and a more specific system diagram illustrating computing components that support secret management. Aspects of the disclosure are further described with respect to a process flow diagram illustrating various processes supporting secret management. Aspects of the disclosure are further illustrated by and described with reference to apparatus diagrams, system diagrams, and flowcharts that relate to secrets management using key agreement.

FIG. 1 illustrates an example of a system 100 for cloud computing that supports secrets management using key agreement in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Some computing systems may support secure data storage. In some examples, a data set, a data payload, or a data store may be encrypted using the same encryption key. That is, one encryption key may be used to secure a large set of data. Using a singular encryption key for one data set may be risky in that if the key is compromised, the entire data set may be compromised. Accidental disclosure of data, such as user data, may compromise the disclosing system, an organization, and the users. An organization that disclosure of data may be legally and financially liable.

According to implementations described herein, the cloud platform 115, the contacts 110, or the clients 105 may support a secure data management system. For example, the cloud platform 115 may support data security at data center 120. Each record, data payload, or secret may be encrypted using a separate encryption key that is generated using key agreement procedures. Because each record or payload is separately encrypted using a different encryption key, security of the data is increased. More particularly, if one key is compromised, the entirety of the data is not compromised.

To support this secure system, a client system, such as a cloud client 105 or a contact 110, referred to as a client herein, may be configured to generate a new key pair for each secret. Further, the secrets management server, which is described as a server herein, may be configured with a key pair including a server public key and a server private key. The client system generates a shared secret using the private key of the new generated key pair and the server public key. The client system may derive an encryption key using the shared secret and encrypt the data payload (e.g., data record) using the derived encryption key. The data payload may be encrypted until it is subsequently requested by the client system or another client system. Upon a request for the encrypted data payload, the secrets management server may derive the same shared secret using the server private key and the public key of the client that was generated for the secret. Using the same shared secret, the secrets management server may derive the encryption key and decrypt the data payload for use by the client.

Using this technique, the secrets management server may access separately encrypted payloads. The client, upon derivation of the shared secret, may erase the private key from the client memory system. As such, the private key may not be reused to derive the same shared secret, and thus, the encryption key. This warrants that the same shared secret and encryption key is not used multiple times for encryption of different data payloads. As such, this technique may increase security relative to prior systems.

It should be appreciated by a person skilled in the art that one or more aspects of the disclosure may be implemented in a system 100 to additionally or alternatively solve other problems than those described above. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

In one example implementation of the system described herein, a developer at a cloud client 105 may be developing a system, such as an application, that may be used by contacts 110. The developer may have some data (e.g., secret) that is to be encrypted until the application is deployed. The developer may generate a new key pair for the secret. Using the private key of the key pair and the public key of the secrets management server (e.g., the cloud platform 115), the client generates a shared secret, derives an encryption key based on the shared secret, and encrypts the data payload using the derived key. Further, the client erases the generated private key from memory. Later, when the application is deployed and the data payload is to be used, the secrets management server may derive the shared secret using the public key generated by the client and the private key of the server, derive the encryption key using the shared secret, and decrypt the data for utilization by the client or the application.

Figure 2:
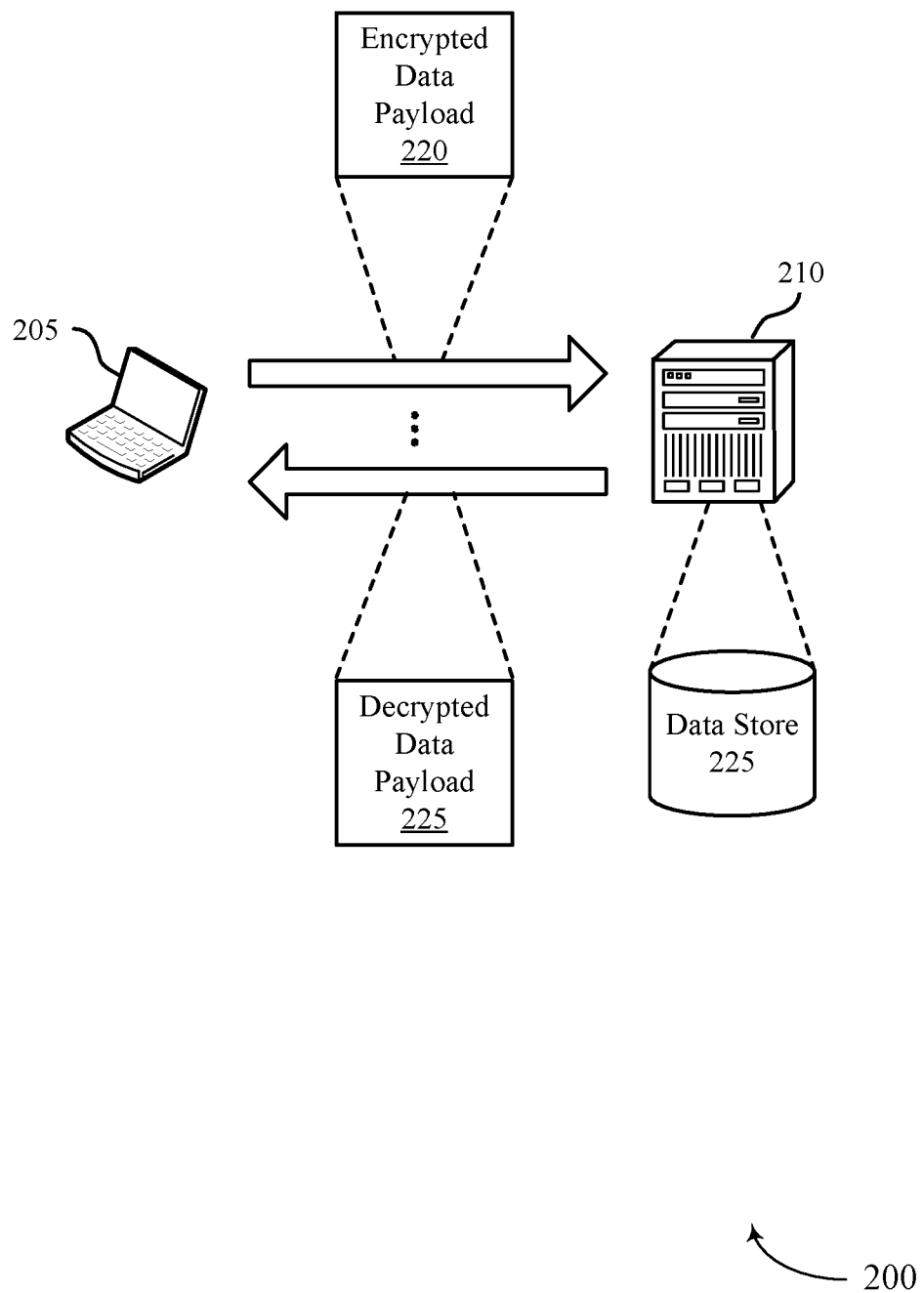
FIG. 2 illustrates an example of a system that supports secrets management using key agreement in accordance with aspects of the present disclosure.

FIG. 2 illustrates an example of a system 200 that supports secrets management using key agreement in accordance with aspects of the present disclosure. The system 200 includes a client 205 and a secrets management server 210. The client 205 may be an example of a user device, a contact 110 or a cloud client 105 of FIG. 1 or a client computing component or system in some other system. The secrets management server 210 may be a server that is managed by the client 205, a server of some external or related system, etc. The secrets management server 210 may be an example of aspects of the cloud platform 115 of FIG. 1. In one example, the secrets management server 210 is an example of or supports a code repository that is associated with the client 205. The secrets management server 210 may be geographically co-located with the client 205 or may be geographically separated from the client 205. The client 205 may communicate with the secrets management server 210 using server/client communications, such as requests and response. The secrets management server 210 may be an example of an application that functions as a server. For example, the secrets management server 210 may be a secrets management application.

The client 205 and the secrets management server 210 may support secret management as described herein. The secrets management server 210 may include a hardware security module or other secure key management system. The secrets management server 210 may be associated with a key pair including a server public key and a server private key. The server private key may be securely stored at the hardware security module such that it is inaccessible by any external systems. The server public key may be available to other systems, such as the client 205. The client 205 may be configured with key generation and other cryptographic capabilities.

The client 205 may have a data payload (e.g., a secret) that is to be encrypted according to implementations described herein. For initiation of the secrets management, the client 205 may generate a key pair including a client private key and a server public key. Using the client private key and the public key of the secrets management server 210, the client 205 may generate a shared secret. Because the shared secret is generated using the client private key and the server public key, the same shared secret may be subsequently generated by the secrets management server 210 using the client public key and the server private key. This technique is supported by the key generation protocols and key agreement protocols. Using the shared secret, the client 205 may derive an encryption key using a key derivation function. The encryption key is used to encrypt the data payload as encrypted data payload 220, which may be stored at the secrets management server 210 or may be subsequently decrypted by the secrets management server. That is, the secrets management server 210 either store the encrypted data payload 220 at a data store 225 for later use or may subsequently decrypt the data payload at a later time upon a request by the client 205 or a related client. In some examples, the secrets management server 210 maintains a record that associates the client public key with the stored or accessible encrypted data payload 220. Further, the client 205 may erase the private key that was used to generate the shared secret. Erasing the private key may include overwriting the memory location of the private key with random values or 0s. As such, the derived encryption key may be used once.

When the client 205 or another authorized system requests the encrypted data payload, the secrets management server 210 may generate the shared secret using the server private key and the public key of the client 205 that was generated for the secret. That is, the shared secret is generated using the public key that is associated with the encrypted data payload 220. The shared secret may be used to derive the encryption key, which is in turn used to decrypt the encrypted data payload 220. The decrypted data payload 220 is returned to the client 205 or an associated system.

In one example, the data payload is an example of a secret that may be used for a deployed system. For example, a user of client 205 may be working in a development environment on a product or application. The user may generate a secret that is to be used when the product or application is in production. The secret may be encrypted using the techniques described herein. The encrypted secret may be shipped with code for production. When the product, service, or application is activated or installed, the secrets management server (e.g., secrets management server 210) may be leveraged to decrypt the secret according to the techniques described herein. That is, the application (e.g., upon installation or activation) may transmit a request to the server to decrypt the secret, and the server may decrypt the secret according to the techniques described herein. Thus, the secrets management server 210 may not actively store the encrypted payloads, but may be leveraged to decrypt secrets when called.

Figure 3:
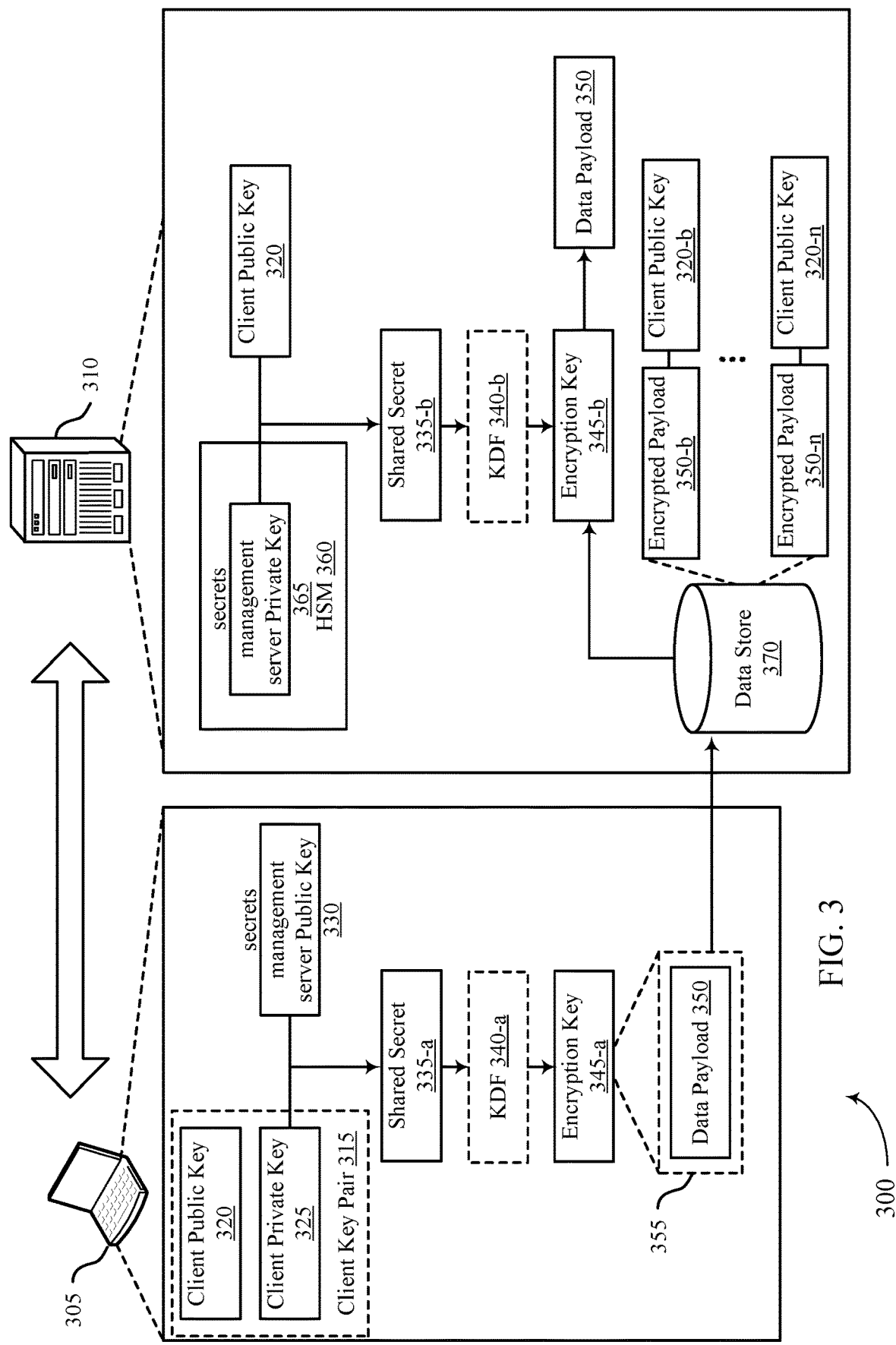
FIG. 3 illustrates an example of a system that supports secrets management using key agreement in accordance with aspects of the present disclosure.

FIG. 3 illustrates an example of a system 300 that supports secrets management using key agreement in accordance with aspects of the present disclosure. The system 300 includes a client 305 and a secrets management server 310, which may be examples of the corresponding devices as described with respect to FIGS. 1 and 2. The client 305 and the secrets management server 310 may be configured to support key agreement and secrets management as described herein. For example, the secrets management server 310 may function as a secrets management application that may be leveraged for management of secrets as described herein.

The client 305 initiates secrets management by generating a client key pair 315, which includes a client public key 320 and a client private key 325. The key pair 315 may be generated using elliptic-curve key generation principles, and as such, the key pair 315 may be an elliptic curve key pair. It should be understood that the key pair 315 may be generated using other key pair generation protocols that support key agreement as described herein.

The secrets management server 310 may also be configured to generate a key pair, such as an elliptic curve key pair. The key pair may be an example of an asymmetric key pair generated by a hardware security module (HSM) 360. The HSM 360 may be an example of a physical secure hardware system, such as a chipset, or a logical or virtual security system. The HSM 360 may support digital key derivation, encryption, decryption, digital signatures, authentication, and other cryptographic functions. The key pair may include a server private key 365, which may be maintained by the HSM 360, and a server public key 330.

The client 305 uses the client private key 325 and the server public key 330 to generate a shared secret 335-a. The shared secret 335-a may be generated using key agreement principals. For example, the ECDH protocol is a key agreement protocol that may be used to generate the shared secret over an insecure channel. That is, the information that is used to generate the shared secret 335 at the respective devices is the public information (e.g., public keys of the other party to the protocol). The shared secret 335-a is input into a key derivation function (KDF) 340-a. The KDF 340-a may be agreed upon between the client 305 and the secrets management server 310. The KDF 340 may be one of many key derivation functions. For example, the KDF 340 may be an example of an advanced encryption standard (AES) function, a Galois/Counter mode (GCM) protocol, or the like. The KDF 340-a outputs an encryption key 345-a that is based at least in part on the shared secret 335-a. The encryption key 345-a is used to encrypt data payload 350 management of secrets. Further, the client 305 may erase the client private key 325 from memory, as described herein.

Encrypted data payload 350 may be stored at data store 370 of the secrets management server 310. The data store 370 may store a plurality of encrypted data payloads 350. In some examples, each encrypted data payload 350 is stored in association with a client public key 320, such that the secrets management server 310 may derive the shared secret 335 and encryption key when the data payload 350 is to be decrypted. However, in some examples, the client 305 may transmit an indication of the public key associated with the data payload 350 that is to be decrypted with a request for the data payload 350. Thus, the secrets management server 310 may not store the client public key information.

However, in some examples, the secrets management server 310 may not store the encrypted data payload 350. For example, the encrypted data payload may be an example of a secret that is to be used by an application in production. As the production code is shipped, the encrypted secret is shipped with the production code. Upon activation, booting, or installation of the application, the secrets management server 310 may be called to decrypt the encrypted data payload 350. The call may include an indication of the public key 320 that is associated with the private key 325 used to derive the symmetric encryption key 345-a. Thus, the server may perform the techniques described herein to decrypt the encrypted data payload 350 for utilization by the production code.

For example, the client 305 may transmit a request for one of the payloads. The secrets management server 310 may identify the encrypted payload corresponding to the request and begin the decryption process. This may include deriving shared secret 335-b, which may correspond to shared secret 335-a, using the respective client public key 320 and the server private key 365. Since the server private key 365 is associated with the secrets management server public key 330 that was used to derive the shared secret 335-a, the server private key 365 and the client public key 320 (associated with the client private key 325 used to derive the shared secret 335-a at the client 305) may be used to derive the shared secret 335-b. The shared secret 335-b is input into the key derivation function 340-b, which may output encryption key 345-b, which may be the same key as encryption key 345-a, since they are both based on the same shared secret 335 and generated by the same KDF 340. The encryption key 345-b may decrypt the encrypted data payload 350 from the data store 370, and serve the data payload 350 to the client 305 or an associated system.

In some cases, aspects of the client 305 and secrets management server 310 may be provided as a hosted service. For example, a third-party system, such as a user device, may request that a data payload be secured in accordance with aspects described herein. The party of the user device may trust that the client 305 and secrets management server 310 may securely erase the private key that is generated for the secret management in order to utilize the service. Thus, in response to a request at the client 305, the client 305 may encrypt the payload which may be subsequently decrypted by the secrets management server 310 or the third party as described herein. In some examples, the code that performs these techniques may be open sources, such that any party may verify the security of these techniques. For example, the code may be analyzed to determine that the private key is securely erased. Because the encryption occurs using a symmetric key derived from a private key, the open-sourcing of the code may not disclose any of the keys that may be used to compromise the system.

Figure 4:
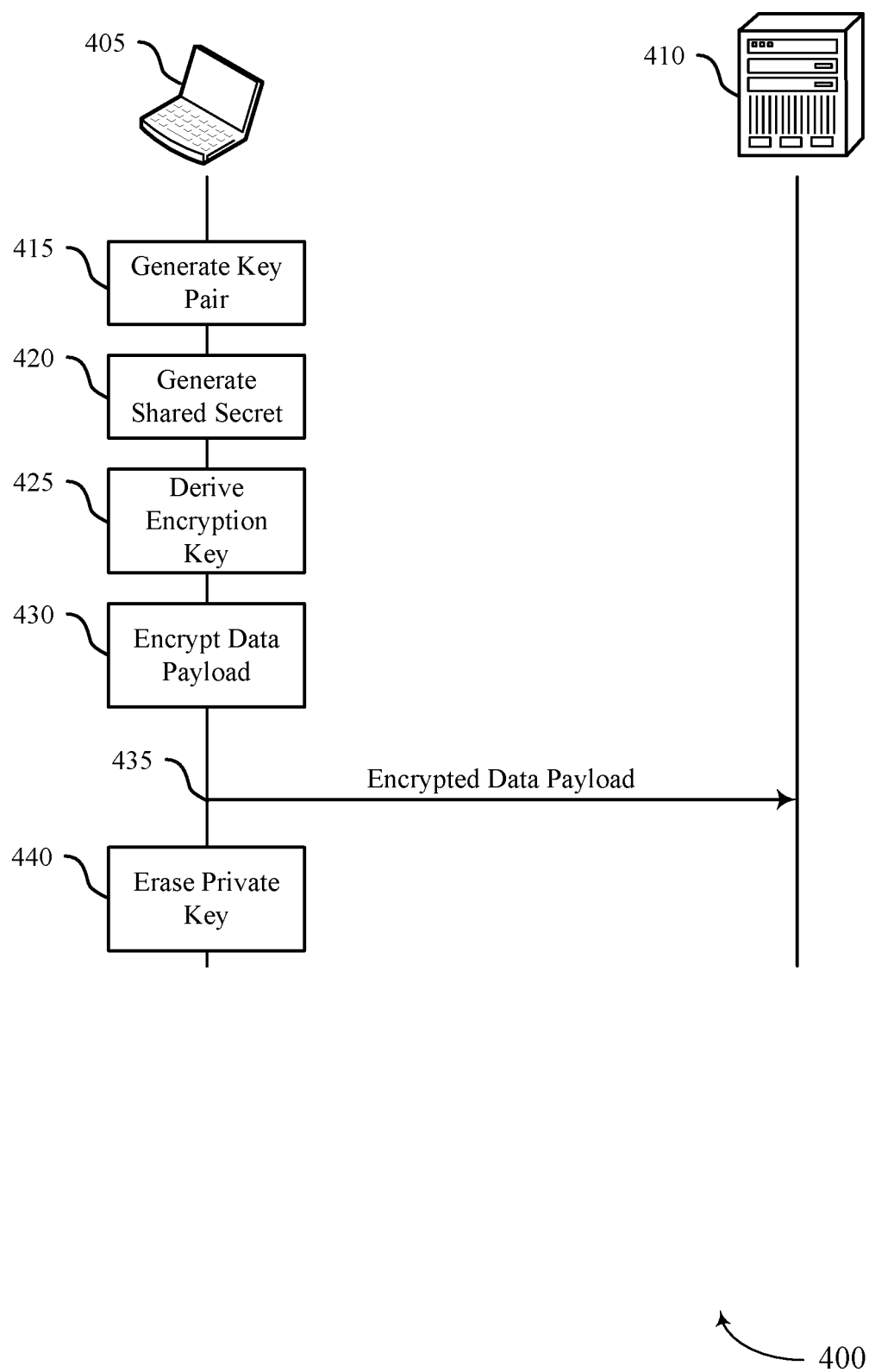
FIG. 4 illustrates an example of a system that supports secrets management using key agreement in accordance with aspects of the present disclosure.

FIG. 4 illustrates an example of a process flow diagram 400 that supports secrets management using key agreement in accordance with aspects of the present disclosure. The process flow diagram 400 includes a client 405 and a secrets management server 410, which may be an example of the corresponding devices described with respect to FIGS. 1 to 3.

At 415, the client 405 may generate a key pair including a public key and a private key for securing a data payload at the secrets management server 410. The key pair may be an example of an elliptic curve key pair.

At 420, the client 405 may generate a shared secret that is shared with the secrets management server using the private key and a public key associated with the secrets management server. The shared secret may be generated using an ECDH protocol.

At 425, the client 405 may derive an encryption key using the shared secret. The encryption key may be derived using a known or unknown key derivation function.

At 430, the client 405 may encrypt the data payload using the encryption key. At 435, the client 405 may cause the encrypted data payload to be decrypted by the secrets management server 410. Causing the encrypted data payload to be decrypted by the secrets management server may include implementing techniques that may cause the secrets management server 410 to be called (e.g., a API request) when the data payload is needed. For example, causing the decryption may include shipping production code that, when activated or installed at another device, causes the secrets management server 410 to be called for decryption of the data payload for use by the production code. As such, the client 405 may implement calls to the secrets management server 410 that may be activated upon code activation. The secrets management server 410 may be configured to derive the encryption key for decrypting the data payload using the shared secret.

At 440, the client 405 may erase the private key from memory of the client 405 in response to encrypting the data payload. As such, it is ensured that the shared secret may be derived using the private key once (e.g., a one-time use key). Subsequently, upon a request from the client 405 or an associated party, the secrets management server 410 may derive the shared secret using the public key of the client (that was generated for the secret) and the private key of the server, derive the encryption key (e.g., decryption key), and decrypt the data payload for use by the client 405 or the associated party.

Figure 5:
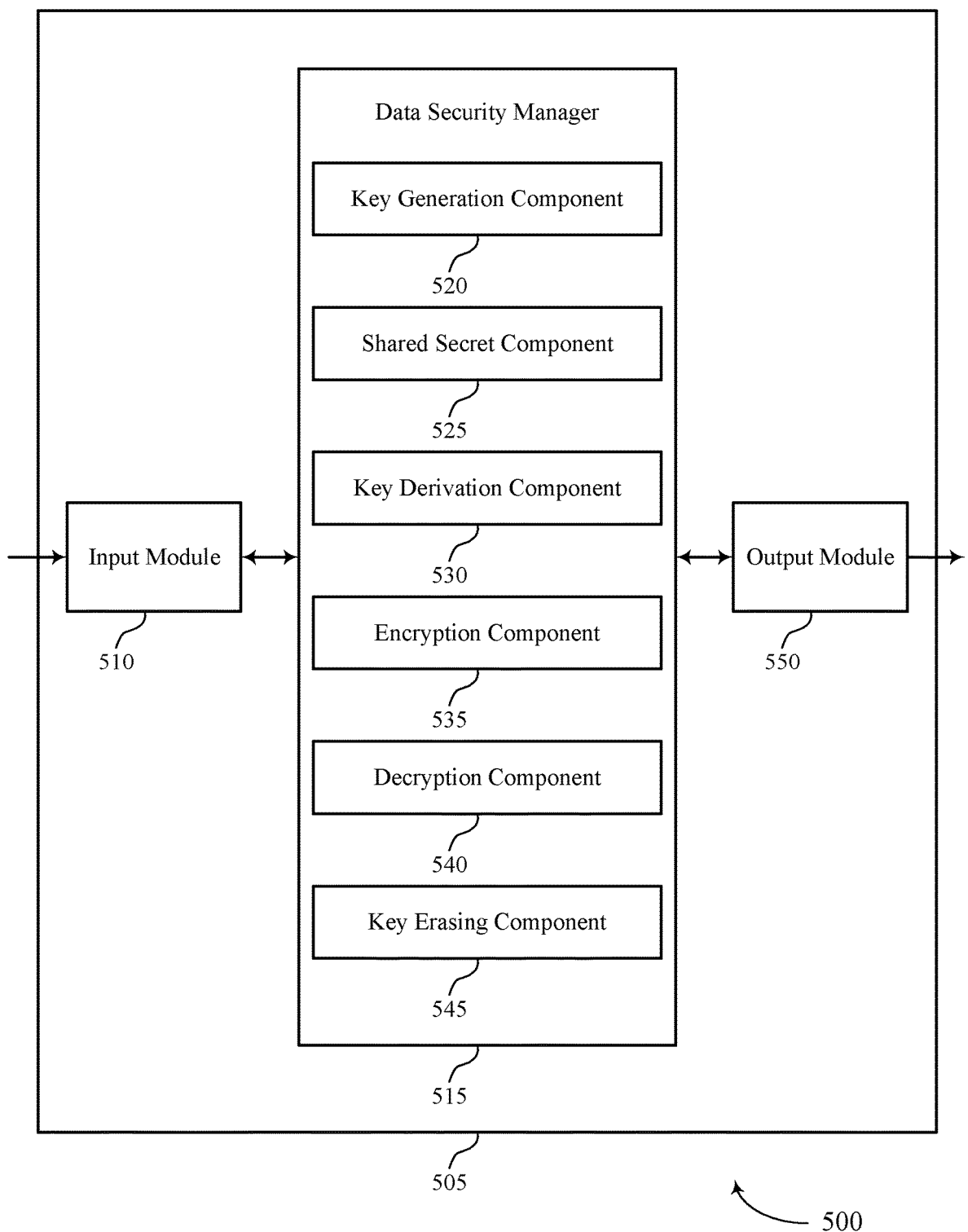
FIG. 5 shows a block diagram of an apparatus that supports secrets management using key agreement in accordance with aspects of the present disclosure.

FIG. 5 shows a block diagram 500 of an apparatus 505 that supports secrets management using key agreement in accordance with aspects of the present disclosure. The apparatus 505 may include an input module 510, a data security manager 515, and an output module 550. The apparatus 505 may also include a processor. Each of these components may be in communication with one another (e.g., via one or more buses). In some cases, the apparatus 505 may be an example of a user terminal, a database server, a client, or a system containing multiple computing devices.

The input module 510 may manage input signals for the apparatus 505. For example, the input module 510 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the apparatus 505 for processing. For example, the input module 510 may transmit input signals to the data security manager 515 to support secrets management using key agreement. In some cases, the input module 510 may be a component of an input/output (I/O) controller 715 as described with reference to FIG. 7.

The data security manager 515 may include a key generation component 520, a shared secret component 525, a key derivation component 530, an encryption component 535, a decryption component 540, and a key erasing component 545. The data security manager 515 may be an example of aspects of the data security manager 605 or 710 described with reference to FIGS. 6 and 7.

The data security manager 515 and/or at least some of its various sub-components may be implemented in hardware, software executed by a processor, firmware, or any combination thereof. If implemented in software executed by a processor, the functions of the data security manager 515 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data security manager 515 and/or at least some of its various sub-components may be physically located at various positions, including being distributed such that portions of functions are implemented at different physical locations by one or more physical devices. In some examples, the data security manager 515 and/or at least some of its various sub-components may be a separate and distinct component in accordance with various aspects of the present disclosure. In other examples, the data security manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The key generation component 520 may generate, at a client, a key pair including a public key and a private key for securing a data payload by a secrets management server. The shared secret component 525 may generate, at the client, a shared secret that is shared with the secrets management server using the private key and a public key associated with the secrets management server. The key derivation component 530 may derive an encryption key using the shared secret.

The encryption component 535 may encrypt the data payload using the encryption key. The decryption component 540 may cause the encrypted data payload to be decrypted by the secrets management server, where the secrets management server is configured to derive the encryption key for decrypting the data payload using the shared secret. The key erasing component 545 may erase the private key from memory of the client in response to causing the encrypted data payload to be transmitted to the secrets management server.

The output module 550 may manage output signals for the apparatus 505. For example, the output module 550 may receive signals from other components of the apparatus 505, such as the data security manager 515, and may transmit these signals to other components or devices. In some specific examples, the output module 550 may transmit output signals for display in a user interface, for storage in a database or data store, for further processing at a server or server cluster, or for any other processes at any number of devices or systems. In some cases, the output module 550 may be a component of an I/O controller 715 as described with reference to FIG. 7.

Figure 6:
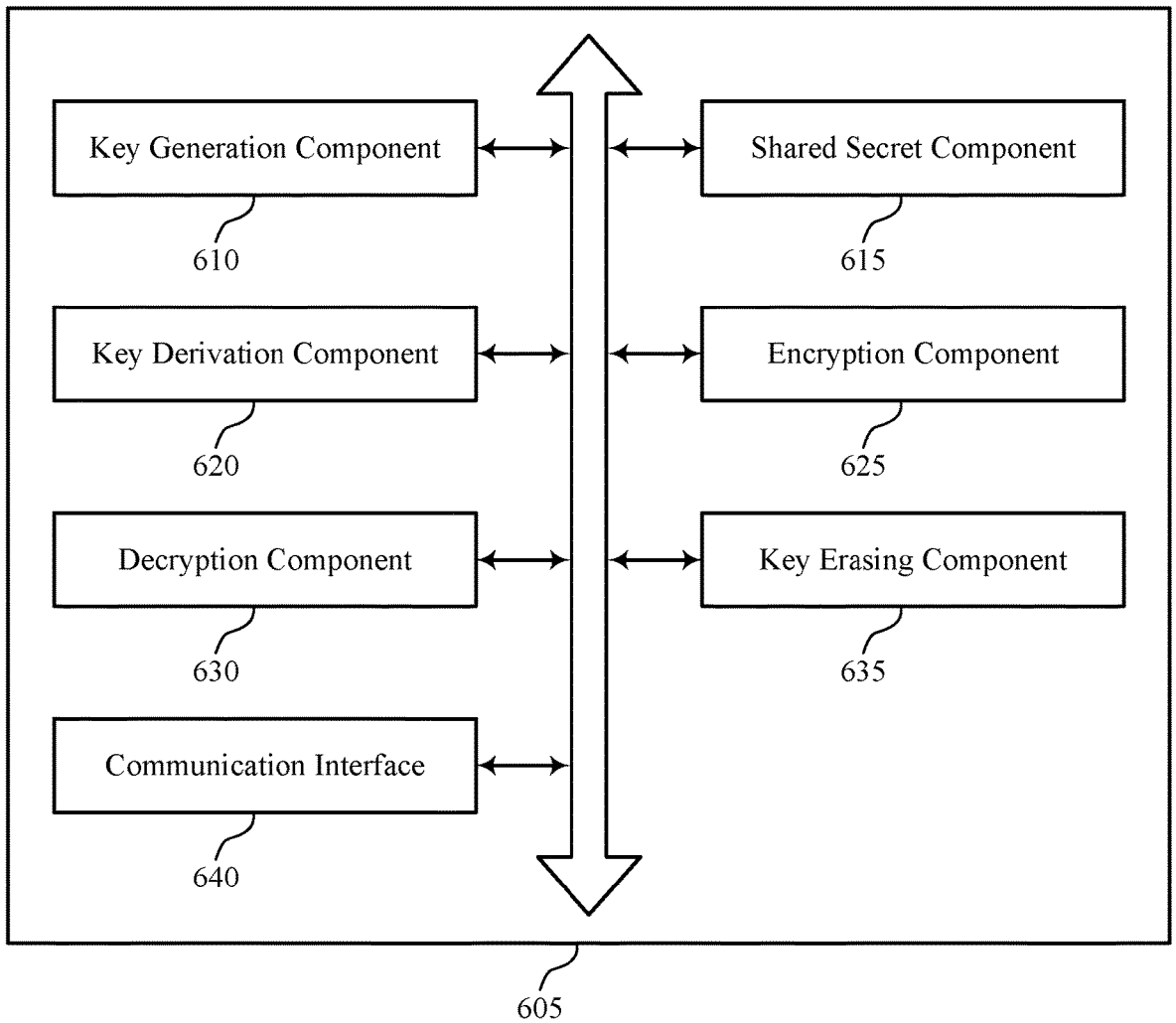
FIG. 6 shows a block diagram of a data security manager that supports secrets management using key agreement in accordance with aspects of the present disclosure.

FIG. 6 shows a block diagram 600 of a data security manager 605 that supports secrets management using key agreement in accordance with aspects of the present disclosure. The data security manager 605 may be an example of aspects of a data security manager 515 or a data security manager 710 described herein. The data security manager 605 may include a key generation component 610, a shared secret component 615, a key derivation component 620, an encryption component 625, a decryption component 630, a key erasing component 635, and a communication interface 640. Each of these modules may communicate, directly or indirectly, with one another (e.g., via one or more buses).

The key generation component 610 may generate, at a client, a key pair including a public key and a private key for securing a data payload by a secrets management server. In some examples, the key generation component 610 may generate a new key pair for each secret of a set of secrets. The shared secret component 615 may generate, at the client, a shared secret that is shared with the secrets management server using the private key and a public key associated with the secrets management server. In some examples, the shared secret component 615 may generate the new shared secret with each respective private key and the public key associated with the secrets management server before each respective private key is erased.

In some examples, the shared secret component 615 may generate the shared secret using an Elliptic-Curve Diffie-Hellman (ECDH) protocol, where the ECDH protocol uses the public key associated with the secrets management server and the private key to derive the shared secret at the client and uses a private key associated with the public key of the secrets management server and the public key of the client to derive the shared secret at the secrets management server.

The key derivation component 620 may derive an encryption key using the shared secret. In some examples, the key derivation component 620 may derive a new encryption key for the new shared secret for each secret of the set of secrets, where a respective data payload for a respective secret is encrypted using the new encryption key.

In some examples, the key derivation component 620 may generate an elliptic curve key pair using elliptic curve key derivation techniques. In some examples, the key derivation component 620 may derive the encryption key using a key derivation function that uses the shared secret as an input. The encryption component 625 may encrypt the data payload using the encryption key.

In some examples, the encryption component 625 may encrypt the data payload using an advanced encryption standard (AES), a Galois/Counter Mode (GCM) protocol, or a combination thereof.

The decryption component 630 may cause the encrypted data payload to be decrypted by the secrets management server, where the secrets management server is configured to derive the encryption key for decrypting the data payload using the shared secret.

The key erasing component 635 may erase the private key from memory of the client in response to causing the encrypted data payload to be transmitted to the secrets management server.

In some examples, the key erasing component 635 may erase, in response to generating a new shared secret for each secrets management process, each respective private key of the new key pair for each secret of the set of secrets, the erasing resulting in the respective private key being a one-time use key.

The communication interface 640 may receive, at the client and from a user device, a request to perform secret management of the data payload, where the encrypted data payload is encrypted based on receiving the request.

Figure 7:
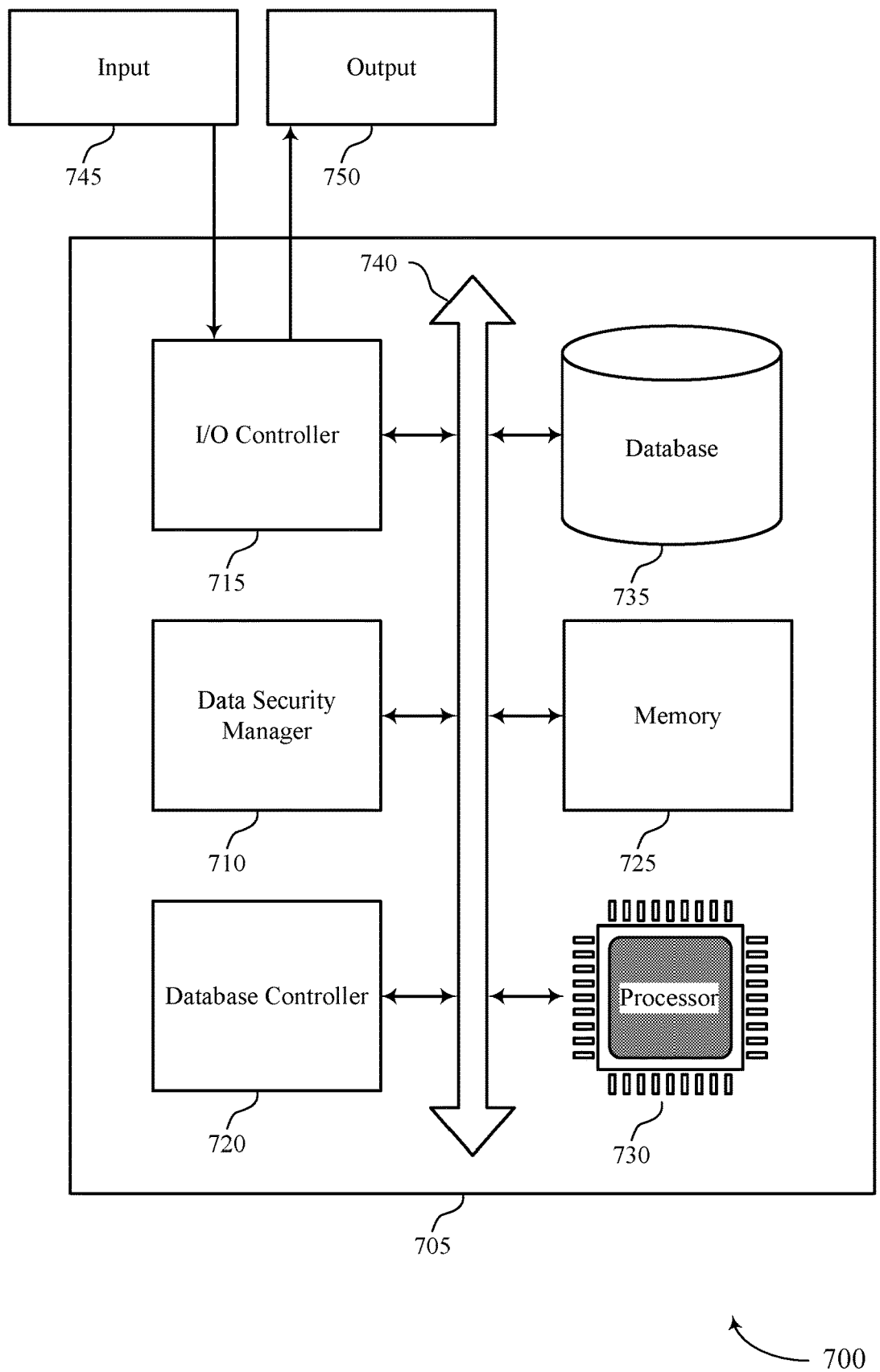
FIG. 7 shows a diagram of a system including a device that supports secrets management using key agreement in accordance with aspects of the present disclosure.

FIG. 7 shows a diagram of a system 700 including a device 705 that supports secrets management using key agreement in accordance with aspects of the present disclosure. The device 705 may be an example of or include the components of a user device or an apparatus 505, a server, or a client, as described herein. The device 705 may include components for bi-directional data communications including components for transmitting and receiving communications, including a data security manager 710, a I/O controller 715, a database controller 720, memory 725, a processor 730, and a database 735. These components may be in electronic communication via one or more buses (e.g., bus 740).

The data security manager 710 may be an example of a data security manager 515 or 605 as described herein. For example, the data security manager 710 may perform any of the methods or processes described above with reference to FIGS. 5 and 6. In some cases, the data security manager 710 may be implemented in hardware, software executed by a processor, firmware, or any combination thereof.

The I/O controller 715 may manage input signals 745 and output signals 750 for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The database controller 720 may manage data storage and processing in a database 735. In some cases, a user may interact with the database controller 720. In other cases, the database controller 720 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause the processor to perform various functions described herein. In some cases, the memory 725 may contain, among other things, a basic input/output system (BIOS) which may control basic hardware or software operation such as the interaction with peripheral components or devices.

The processor 730 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting secrets management using key agreement).

Figure 8:
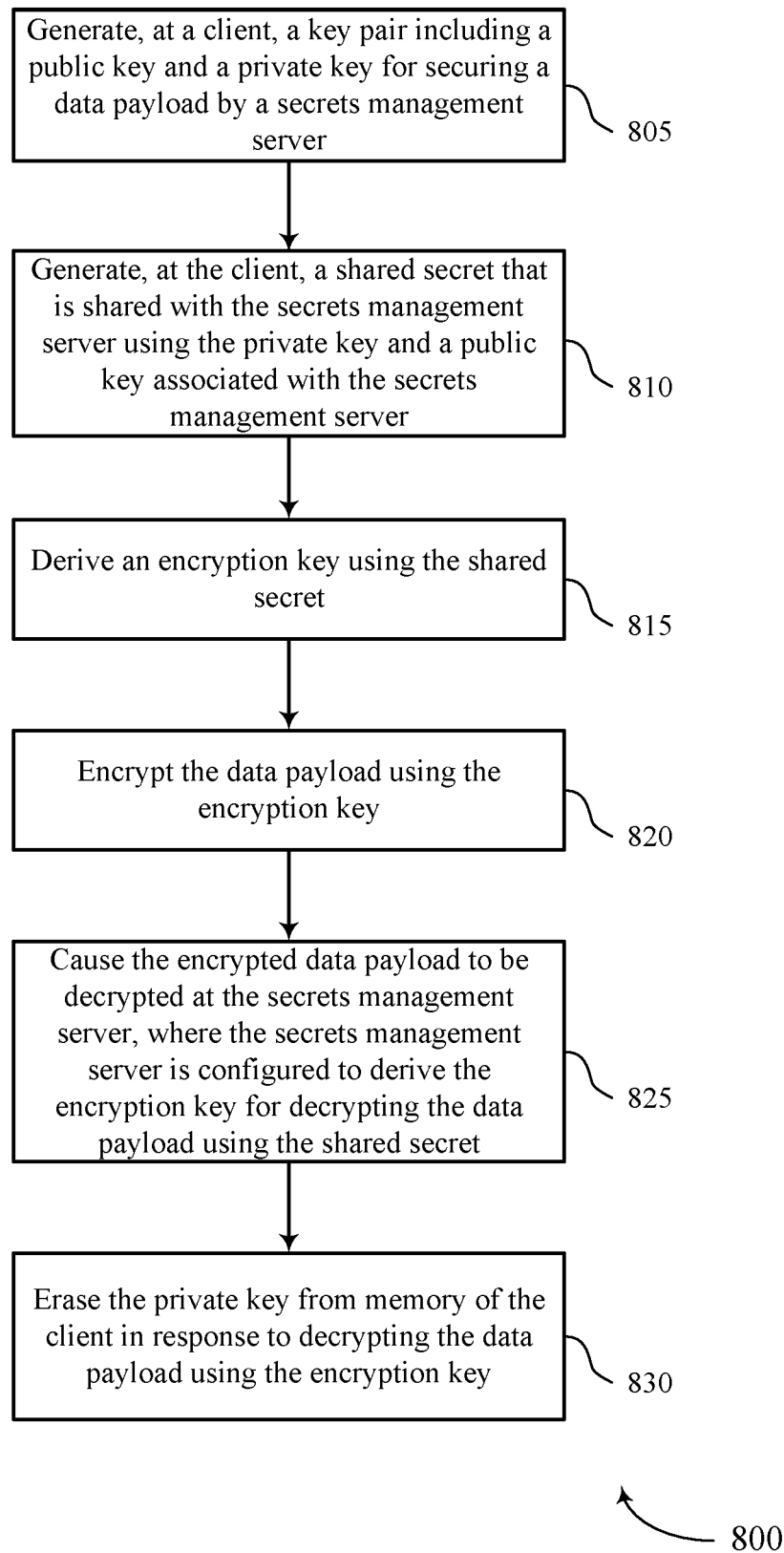
FIGS. 8 and 9 show flowcharts illustrating methods that support secrets management using key agreement in accordance with aspects of the present disclosure.

FIG. 8 shows a flowchart illustrating a method 800 that supports secrets management using key agreement in accordance with aspects of the present disclosure. The operations of method 800 may be implemented by a user device or its components as described herein. For example, the operations of method 800 may be performed by a data security manager as described with reference to FIGS. 5 through 7. In some examples, a user device may execute a set of instructions to control the functional elements of the user device to perform the functions described below. Additionally or alternatively, a user device may perform aspects of the functions described below using special-purpose hardware.

At 805, the user device may generate, at a client, a key pair including a public key and a private key for securing a data payload by a secrets management server. The operations of 805 may be performed according to the methods described herein. In some examples, aspects of the operations of 805 may be performed by a key generation component as described with reference to FIGS. 5 through 7.

At 810, the user device may generate, at the client, a shared secret that is shared with the secrets management server using the private key and a public key associated with the secrets management server. The operations of 810 may be performed according to the methods described herein. In some examples, aspects of the operations of 810 may be performed by a shared secret component as described with reference to FIGS. 5 through 7.

At 815, the user device may derive an encryption key using the shared secret. The operations of 815 may be performed according to the methods described herein. In some examples, aspects of the operations of 815 may be performed by a key derivation component as described with reference to FIGS. 5 through 7.

At 820, the user device may encrypt the data payload using the encryption key. The operations of 820 may be performed according to the methods described herein. In some examples, aspects of the operations of 820 may be performed by an encryption component as described with reference to FIGS. 5 through 7.

At 825, the user device may cause the encrypted data payload to be decrypted by the secrets management server, where the secrets management server is configured to derive the encryption key for decrypting the data payload using the shared secret. The operations of 825 may be performed according to the methods described herein. In some examples, aspects of the operations of 825 may be performed by a decryption component as described with reference to FIGS. 5 through 7.

At 830, the user device may erase the private key from memory of the client in response to causing the encrypted data payload to be transmitted to the secrets management server. The operations of 830 may be performed according to the methods described herein. In some examples, aspects of the operations of 830 may be performed by a key erasing component as described with reference to FIGS. 5 through 7.

Figure 9:
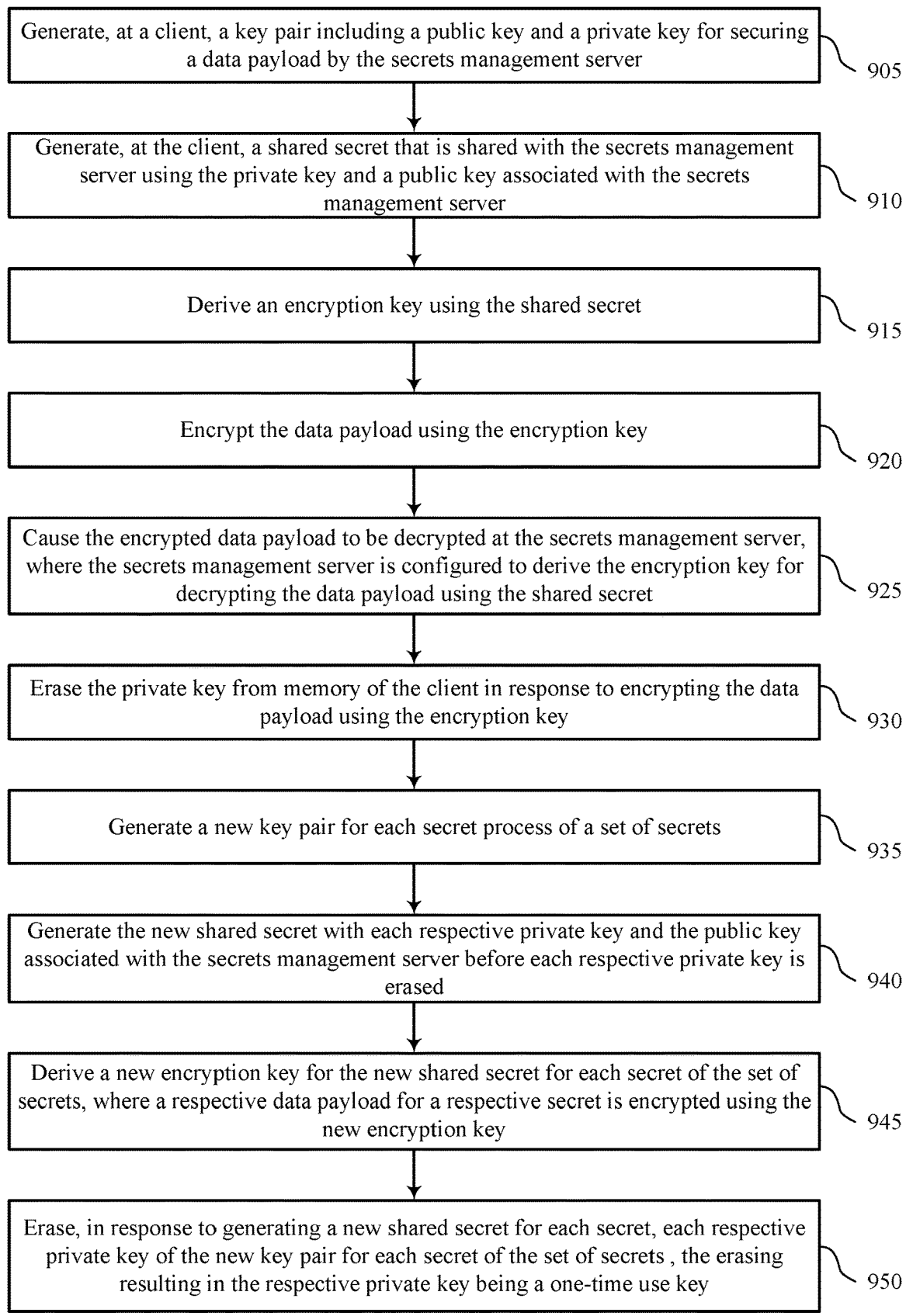

FIG. 9 shows a flowchart illustrating a method 900 that supports secrets management using key agreement in accordance with aspects of the present disclosure. The operations of method 900 may be implemented by a user device or its components as described herein. For example, the operations of method 900 may be performed by a data security manager as described with reference to FIGS. 5 through 7. In some examples, a user device may execute a set of instructions to control the functional elements of the user device to perform the functions described below. Additionally or alternatively, a user device may perform aspects of the functions described below using special-purpose hardware.

At 905, the user device may generate, at a client, a key pair including a public key and a private key for securing a data payload by a secrets management server. The operations of 905 may be performed according to the methods described herein. In some examples, aspects of the operations of 905 may be performed by a key generation component as described with reference to FIGS. 5 through 7.

At 910, the user device may generate, at the client, a shared secret that is shared with the secrets management server using the private key and a public key associated with the secrets management server. The operations of 910 may be performed according to the methods described herein. In some examples, aspects of the operations of 910 may be performed by a shared secret component as described with reference to FIGS. 5 through 7.

At 915, the user device may derive an encryption key using the shared secret. The operations of 915 may be performed according to the methods described herein. In some examples, aspects of the operations of 915 may be performed by a key derivation component as described with reference to FIGS. 5 through 7.

At 920, the user device may encrypt the data payload using the encryption key. The operations of 920 may be performed according to the methods described herein. In some examples, aspects of the operations of 920 may be performed by an encryption component as described with reference to FIGS. 5 through 7.

At 925, the user device may cause the encrypted data payload to be decrypted by the secrets management server, where the secrets management server is configured to derive the encryption key for decrypting the data payload using the shared secret. The operations of 925 may be performed according to the methods described herein. In some examples, aspects of the operations of 925 may be performed by a decryption component as described with reference to FIGS. 5 through 7.

At 930, the user device may erase the private key from memory of the client in response to causing the encrypted data payload to be transmitted to the secrets management server. The operations of 930 may be performed according to the methods described herein. In some examples, aspects of the operations of 930 may be performed by a key erasing component as described with reference to FIGS. 5 through 7.

At 935, the user device may generate a new key pair for each secret of a set of secrets. The operations of 935 may be performed according to the methods described herein. In some examples, aspects of the operations of 935 may be performed by a key generation component as described with reference to FIGS. 5 through 7.

At 940, the user device may generate the new shared secret with each respective private key and the public key associated with the secrets management server before each respective private key is erased. The operations of 940 may be performed according to the methods described herein. In some examples, aspects of the operations of 940 may be performed by a shared secret component as described with reference to FIGS. 5 through 7.

At 945, the user device may derive a new encryption key for the new shared secret for each secret of the set of secrets, where a respective data payload for a respective secret is encrypted using the new encryption key. The operations of 945 may be performed according to the methods described herein. In some examples, aspects of the operations of 945 may be performed by a key derivation component as described with reference to FIGS. 5 through 7.

At 950, the user device may erase, in response to generating a new shared secret for each secret, each respective private key of the new key pair for each secret of the set of secrets, the erasing resulting in the respective private key being a one-time use key. The operations of 950 may be performed according to the methods described herein. In some examples, aspects of the operations of 950 may be performed by a key erasing component as described with reference to FIGS. 5 through 7.

A method of securing data is described. The method may include generating, at a client, a key pair including a public key and a private key for securing a data payload by a secrets management server, generating, at the client, a shared secret that is shared with the secrets management server using the private key and a public key associated with the secrets management server, deriving an encryption key using the shared secret, encrypting the data payload using the encryption key, causing the encrypted data payload to be decrypted by the secrets management server, where the secrets management server is configured to derive the encryption key for decrypting the data payload using the shared secret, and erasing the private key from memory of the client in response to causing the encrypted data payload to be transmitted to the secrets management server.

An apparatus for securing data is described. The apparatus may include a processor, memory coupled with the processor, and instructions stored in the memory. The instructions may be executable by the processor to cause the apparatus to generate, at a client, a key pair including a public key and a private key for securing a data payload by a secrets management server, generate, at the client, a shared secret that is shared with the secrets management server using the private key and a public key associated with the secrets management server, derive an encryption key using the shared secret, encrypt the data payload using the encryption key, cause the encrypted data payload to be decrypted by the secrets management server, where the secrets management server is configured to derive the encryption key for decrypting the data payload using the shared secret, and erase the private key from memory of the client in response to causing the encrypted data payload to be transmitted to the secrets management server.

Another apparatus for securing data is described. The apparatus may include means for generating, at a client, a key pair including a public key and a private key for securing a data payload by a secrets management server, generating, at the client, a shared secret that is shared with the secrets management server using the private key and a public key associated with the secrets management server, deriving an encryption key using the shared secret, encrypting the data payload using the encryption key, causing the encrypted data payload to be decrypted by the secrets management server, where the secrets management server is configured to derive the encryption key for decrypting the data payload using the shared secret, and erasing the private key from memory of the client in response to causing the encrypted data payload to be transmitted to the secrets management server.

A non-transitory computer-readable medium storing code for securing data is described. The code may include instructions executable by a processor to generate, at a client, a key pair including a public key and a private key for securing a data payload by a secrets management server, generate, at the client, a shared secret that is shared with the secrets management server using the private key and a public key associated with the secrets management server, derive an encryption key using the shared secret, encrypt the data payload using the encryption key, cause the encrypted data payload to be decrypted by the secrets management server, where the secrets management server is configured to derive the encryption key for decrypting the data payload using the shared secret, and erase the private key from memory of the client in response to causing the encrypted data payload to be transmitted to the secrets management server.

Some examples of the method, apparatuses, and non-transitory computer-readable medium described herein may further include operations, features, means, or instructions for generating a new key pair for each secret of a set of secrets, and erasing, in response to generating a new shared secret for each secret, each respective private key of the new key pair for each secret of the set of secrets, the erasing resulting in the respective private key being a one-time use key.

Some examples of the method, apparatuses, and non-transitory computer-readable medium described herein may further include operations, features, means, or instructions for generating the new shared secret with each respective private key and the public key associated with the secrets management server before each respective private key may be erased, and deriving a new encryption key for the new shared secret for each secret of the set of secrets, where a respective data payload for a respective secret may be encrypted using the new encryption key.

Some examples of the method, apparatuses, and non-transitory computer-readable medium described herein may further include operations, features, means, or instructions for receiving, at the client and from a user device, a request to perform secret management of the data payload, where the encrypted data payload may be stored based on receiving the request.

In some examples of the method, apparatuses, and non-transitory computer-readable medium described herein, generating the shared secret may include operations, features, means, or instructions for generating the shared secret using an Elliptic-Curve Diffie-Hellman (ECDH) protocol, where the ECDH protocol uses the public key associated with the secrets management server and the private key to derive the shared secret at the client and uses a private key associated with the public key of the secrets management serve rand the public key of the client to derive the shared secret at the secrets management server.

In some examples of the method, apparatuses, and non-transitory computer-readable medium described herein, generating the key pair may include operations, features, means, or instructions for generating an elliptic curve key pair using elliptic curve key derivation techniques.

In some examples of the method, apparatuses, and non-transitory computer-readable medium described herein, deriving the encryption key may include operations, features, means, or instructions for deriving the encryption key using a key derivation function that uses the shared secret as an input.

In some examples of the method, apparatuses, and non-transitory computer-readable medium described herein, encrypting the data payload using the encryption key may include operations, features, means, or instructions for encrypting the data payload using an advanced encryption standard (AES), a Galois/Counter Mode (GCM) protocol, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for securing data, comprising:
generating, at a client, a key pair including a public key and a private key for securing a data payload by a secrets management server;
generating, at the client, a shared secret that is shared with the secrets management server using the private key and a public key associated with the secrets management server;
deriving an encryption key using the shared secret;
encrypting the data payload using the encryption key;
causing the encrypted data payload to be decrypted by the secrets management server, wherein the secrets management server is configured to derive the encryption key for decrypting the data payload using the shared secret; and
erasing the private key from memory of the client in response to encrypting the data payload using the encryption key.

2. The method of claim 1, further comprising:
generating a new key pair for each secret of a plurality of secrets; and
erasing, in response to generating a new shared secret for each secret, each respective private key of the new key pair for each secret of the plurality of secrets, the erasing resulting in the respective private key being a one-time use key.

3. The method of claim 2, further comprising:
generating the new shared secret with each respective private key and the public key associated with the secrets management server before each respective private key is erased; and
deriving a new encryption key for the new shared secret for each secret of the plurality of secrets, wherein a respective data payload for a respective secret is encrypted using the new encryption key.

4. The method of claim 1, further comprising:
receiving, at the client and from a user device, a request to perform secret management of the data payload, wherein the encrypted data payload is encrypted based at least in part on receiving the request.

5. The method of claim 1, wherein generating the shared secret comprises:
generating the shared secret using an Elliptic-Curve Diffie-Hellman (ECDH) protocol, wherein the ECDH protocol uses the public key associated with the secrets management server and the private key to derive the shared secret at the client and uses a private key associated with the public key of the secrets management server and the public key of the client to derive the shared secret at the secrets management server.

6. The method of claim 1, wherein generating the key pair comprises:
generating an elliptic curve key pair using elliptic curve key derivation techniques.

7. The method of claim 1, wherein deriving the encryption key comprises:
    deriving the encryption key using a key derivation function that uses the shared secret as an input.

8. The method of claim 1, wherein encrypting the data payload using the encryption key comprises:
    encrypting the data payload using an advanced encryption standard (AES), a Galois/Counter Mode (GCM) protocol, or a combination thereof.

9. An apparatus for securing data, comprising:
    a processor;
    memory coupled with the processor; and
    instructions stored in the memory and executable by the processor to cause the apparatus to:
        generate, at a client, a key pair including a public key and a private key for securing a data payload by a secrets management server;
        generate, at the client, a shared secret that is shared with the secrets management server using the private key and a public key associated with the secrets management server;
        derive an encryption key using the shared secret;
        encrypt the data payload using the encryption key;
        cause the encrypted data payload to be decrypted by the secrets management server, wherein the secrets management server is configured to derive the encryption key for decrypting the data payload using the shared secret; and
        erase the private key from memory of the client in response to encrypting the data payload using the encryption key.

10. The apparatus of claim 9, wherein the instructions are further executable by the processor to cause the apparatus to:
    generate a new key pair for each secret of a plurality of secrets; and
    erase, in response to generating a new shared secret for each secret, each respective private key of the new key pair for each secret of the plurality of secrets, the erasing resulting in the each respective private key being a one-time use key.

11. The apparatus of claim 10, wherein the instructions are further executable by the processor to cause the apparatus to:
    generate the new shared secret with each respective private key and the public key associated with the secrets management server before each respective private key is erased; and
    derive a new encryption key for the new shared secret for each secret of the plurality of secrets, wherein a respective data payload for a respective secret is encrypted using the new encryption key.

12. The apparatus of claim 9, wherein the instructions are further executable by the processor to cause the apparatus to:
    receive, at the client and from a user device, a request to perform secret management of the data payload, wherein the encrypted data payload is encrypted based at least in part on receiving the request.

13. The apparatus of claim 9, wherein the instructions to generate the shared secret are executable by the processor to cause the apparatus to:
    generate the shared secret using an Elliptic-Curve Diffie-Hellman (ECDH) protocol, wherein the ECDH protocol uses the public key associated with the secrets management server and the private key to derive the shared secret at the client and uses a private key associated with the public key of the secrets management server and the public key of the client to derive the shared secret at the secrets management server.

14. The apparatus of claim 9, wherein the instructions to generate the key pair are executable by the processor to cause the apparatus to:
    generate an elliptic curve key pair using elliptic curve key derivation techniques.

15. A non-transitory computer-readable medium storing code for securing data, the code comprising instructions executable by a processor to:
    generate, at a client, a key pair including a public key and a private key for securing a data payload by a secrets management server;
    generate, at the client, a shared secret that is shared with the secrets management server using the private key and a public key associated with the secrets management server;
    derive an encryption key using the shared secret;
    encrypt the data payload using the encryption key;
    cause the encrypted data payload to be decrypted by the secrets management server, wherein the secrets management server is configured to derive the encryption key for decrypting the data payload using the shared secret; and
    erase the private key from memory of the client in response to encrypting the data payload using the encryption key.

16. The non-transitory computer-readable medium of claim 15, wherein the instructions are further executable to:
    generate a new key pair for each secret of a plurality of secrets; and
    erase, in response to generating a new shared secret for each secret, each respective private key of the new key pair for each secret of the plurality of secrets, the erasing resulting in the respective private key being a one-time use key.

17. The non-transitory computer-readable medium of claim 16, wherein the instructions are further executable to:
    generate the new shared secret with each respective private key and the public key associated with the secrets management server before each respective private key is erased; and
    derive a new encryption key for the new shared secret for each secret of the plurality of secrets, wherein a respective data payload for a respective secret is encrypted using the new encryption key.

18. The non-transitory computer-readable medium of claim 15, wherein the instructions are further executable to:
    receive, at the client and from a user device, a request to perform secret management of the data payload, wherein the encrypted data payload is encrypted based at least in part on receiving the request.

19. The non-transitory computer-readable medium of claim 15, wherein the instructions to generate the shared secret are executable to:
    generate the shared secret using an Elliptic-Curve Diffie-Hellman (ECDH) protocol, wherein the ECDH protocol uses the public key associated with the secrets management server and the private key to derive the shared secret at the client and uses a private key associated with the public key of the secrets management server and the public key of the client to derive the shared secret at the secrets management server.

20. The non-transitory computer-readable medium of claim 15, wherein the instructions to generate the key pair are executable to:

generate an elliptic curve key pair using elliptic curve key derivation techniques.

* * * * *